No. 714,109. Patented Nov. 18, 1902.
E. O. HENDERSON & J. B. THOMPSON.
STRIPPER FOR WIRE INSULATION.
(Application filed Feb. 10, 1902.)
(No Model.)
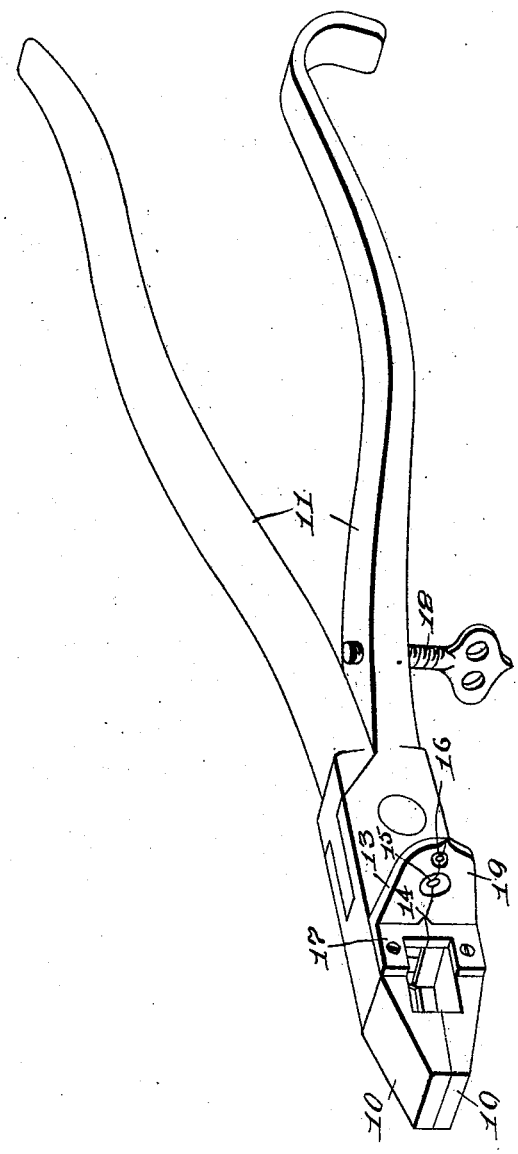

UNITED STATES PATENT OFFICE.

ELMER O. HENDERSON AND JACOB B. THOMPSON, OF OKOBOJI, IOWA.

STRIPPER FOR WIRE INSULATION.

SPECIFICATION forming part of Letters Patent No. 714,109, dated November 18, 1902.

Application filed February 10, 1902. Serial No. 93,375. (No model.)

*To all whom it may concern:*

Be it known that we, ELMER O. HENDERSON and JACOB B. THOMPSON, citizens of the United States, residing at Okoboji, in the county of Dickinson and State of Iowa, have invented certain new and useful Improvements in Strippers for Wire Insulation, of which the following is a specification.

The objects of our invention are to provide insulator-stripping and wire-cutting jaws that may readily, quickly, and easily be applied to ordinary pliers, whereby the operator may quickly and easily cut insulation on a wire in a circle around the wire and then he may by holding the wire and pulling upon the pliers strip the insulation from the wire.

A further object is to provide means whereby these jaws may be set with such accuracy that the insulation may be stripped from the wire and at the same time the wire may be scraped so as to present a smooth bright surface by which perfect electrical connections may be made, and, further, it is our object to provide a device of this class that may be used as a wire-cutter, if desired.

Our invention consists in certain details in the construction, the arrangement, and combination of the various parts of the device whereby the objects contemplated are attained, as hereinafter more fully set forth, pointed out in our claims, and illustrated in the accompanying drawing, in which the complete improvements are shown applied to a pair of pliers as required for use.

Referring to the accompanying drawing, we have used the reference-numeral 10 to indicate the jaws of a pair of pliers and 11 the handles thereof. These parts are pivoted together in the ordinary way. Mounted in one of the handles 11 I have provided a set-screw 12, seated in said handle with its inner end in position to be engaged by the other handle, thereby holding the handles apart and remitting the movement of the jaws toward each other.

The reference-numeral 13 indicates a blade having one edge sharpened and provided with a straight cutting edge 14, a large semicircular cutting edge 15, and a small semicircular cutting edge 16, and formed integral with the blade is a right-angled projection 17, provided with an opening by which it may be screwed to one of the jaws 10. The other blade (indicated by the numeral 19) is a counterpart of the first and is secured to the opposite jaw.

In practical use and assuming that the blades are attached to the opposite jaws of a pair of pliers and that the semicircular openings of the blades coincide and the straight cutting edges are in contact when the jaws of the pliers are together, then assuming that it is desired to cut the insulation from a wire in which the wire proper is of the same diameter as the diameter of the large semicircular openings the operator proceeds by placing the wire in one of the large semicircular openings, then bringing the handles together at once, forcing the semicircular cutting edges to sever the adjacent portion of the insulation on the wire. When this is done, it is possible that a portion of the insulation at the point where the cutting-blades meet remains intact, and in order to sever this portion it is only necessary to hold the wire stationary and partially rotate the pliers, thus completely severing the insulation. Then the operator pulls upon the pliers and strips the insulation from the wire. When this is being done, the semicircular cutting edges closely engage the surface of the wire proper and scrape it clean, so that good electrical connections may be made with it. Obviously the scraping processes may be continued a number of times, as found necessary. Assuming that a wire is found which will not fit accurately in either of the pairs of semicircular openings, it is only necessary to adjust the set-screw so that when the jaws come together the edges of the semicircular blades will just touch the diametrically opposite side of the wire and they will cut the insulation to the wire at these places. Then as the pliers are rotated they will cut around the insulation and completely sever it. Then the insulation may be stripped from the wire, as before described. Furthermore, the straight edge portions of the blades form good wire-cutters and are very conveniently arranged relative to the semicircular openings.

Having thus described our invention, what we claim, and desire to secure by Letters Patent of the United States, is—

1. An improved combined pliers, wire-cutter, and insulator-stripper, comprising two plier members hinged together, two cutting-blades projecting at right angles from the plier-jaws and having sharpened edges arranged to engage each other when the jaws are closed and each cutting edge being provided with one or more semicircular notches, the edges of the notches being also sharpened and the semicircular notches of one blade being arranged in alinement with those of the other blade.

2. An improved pliers, wire-cutter, and insulator-stripper, comprising two plier members hinged together, a detachable cutting-blade fixed to each jaw and extended at right angles thereto, each blade having a cutting edge provided with two or more semicircular notches of different sizes and also a straight edge, all of which are sharp, and a set-screw in one of the plier-handles to engage the other handle, all arranged and combined in the manner set forth and for the purposes stated.

ELMER O. HENDERSON.
JACOB B. THOMPSON.

Witnesses:
FRANK P. HOPKINS,
JOHN RICHARDSON.